(12) United States Patent
Wilson et al.

(10) Patent No.: US 9,348,451 B2
(45) Date of Patent: May 24, 2016

(54) CHANNEL SCAN ARCHITECTURE FOR MULTIPLE STIMULUS MULTI-TOUCH SENSOR PANELS

(75) Inventors: Thomas James Wilson, Pleasanton, CA (US); Christoph Horst Krah, Los Altos, CA (US); Minh-Dieu Thi Vu, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 932 days.

(21) Appl. No.: 12/208,315

(22) Filed: Sep. 10, 2008

(65) Prior Publication Data

US 2010/0060590 A1 Mar. 11, 2010

(51) Int. Cl.
*G06F 3/0488* (2013.01)
*G06F 3/041* (2006.01)

(52) U.S. Cl.
CPC ..................... *G06F 3/0416* (2013.01)

(58) Field of Classification Search
CPC .... G06F 3/0488; G06F 3/04883; G06F 3/044
USPC ......... 345/156–160, 162, 165–166, 168–169, 345/172–173; 178/18.01, 19.01, 20.1, 178/18.03, 18.05, 18.06, 20.01; 715/761; 325/517
See application file for complete search history.

(56) References Cited

U.S. PATENT DOCUMENTS

| | | | |
|---|---|---|---|
| 4,444,998 A * | 4/1984 | House | 178/18.05 |
| 5,355,149 A * | 10/1994 | Casebolt | 345/175 |
| 5,483,261 A | 1/1996 | Yasutake | |
| 5,488,204 A | 1/1996 | Mead et al. | |
| 5,526,294 A | 6/1996 | Ono et al. | |
| 5,543,590 A * | 8/1996 | Gillespie et al. | 178/18.06 |
| 5,650,801 A | 7/1997 | Higashi | |
| 5,766,463 A | 6/1998 | Janik et al. | |
| 5,816,225 A | 10/1998 | Koch et al. | |
| 5,825,352 A | 10/1998 | Bisset et al. | |
| 5,835,079 A | 11/1998 | Shieh | |

(Continued)

FOREIGN PATENT DOCUMENTS

| | | | |
|---|---|---|---|
| JP | 2000-163031 A | 6/2000 |
| JP | 2002-342033 A | 11/2002 |

(Continued)

OTHER PUBLICATIONS

Lee, S.K. et al. (Apr. 1985). "A Multi-Touch Three Dimensional Touch-Sensitive Tablet," *Proceedings of CHI: ACM Conference on Human Factors in Computing Systems*, pp. 21-25.

(Continued)

*Primary Examiner* — Kumar Patel
*Assistant Examiner* — Mansour M Said
(74) *Attorney, Agent, or Firm* — Morrison & Foerster LLP

(57) ABSTRACT

A channel scan architecture for detecting touch events on a touch sensor panel is disclosed. The channel scan architecture can combine drive logic, sense channels and channel scan logic on a single monolithic chip. The channel scan logic can be configured to implement a sequence of scanning processes in a panel subsystem without intervention from a panel processor. The channel scan architecture can provide scan sequence control to enable the panel processor to control the sequence in which individual scans are implemented in the panel subsystem. Type of scans that can be implemented in the panel subsystem can include a spectral analysis scan, touch scan, phantom touch scan, ambient light level scan, proximity scan and temperature scan.

21 Claims, 15 Drawing Sheets

(56) References Cited

U.S. PATENT DOCUMENTS

| | | | |
|---|---|---|---|
| 5,880,411 A | 3/1999 | Gillespie et al. | |
| 5,920,309 A * | 7/1999 | Bisset et al. | 345/173 |
| 6,075,520 A | 6/2000 | Inoue et al. | |
| 6,188,391 B1 | 2/2001 | Seely et al. | |
| 6,310,610 B1 | 10/2001 | Beaton et al. | |
| 6,323,846 B1 * | 11/2001 | Westerman et al. | 345/173 |
| 6,327,011 B2 | 12/2001 | Kim | |
| 6,690,387 B2 | 2/2004 | Zimmerman et al. | |
| 6,816,750 B1 | 11/2004 | Klaas | |
| 7,015,894 B2 | 3/2006 | Morohoshi | |
| 7,184,064 B2 | 2/2007 | Zimmerman et al. | |
| 7,289,142 B2 | 10/2007 | Silverbrook | |
| 7,362,313 B2 * | 4/2008 | Geaghan et al. | 345/173 |
| 7,643,011 B2 * | 1/2010 | O'Connor et al. | 345/173 |
| 7,663,607 B2 | 2/2010 | Hotelling et al. | |
| 8,026,904 B2 * | 9/2011 | Westerman | 345/173 |
| 8,237,667 B2 | 8/2012 | Krah | |
| 8,479,122 B2 | 7/2013 | Hotelling et al. | |
| 8,592,697 B2 | 11/2013 | Hotelling et al. | |
| 8,593,423 B2 | 11/2013 | Hotelling et al. | |
| 8,791,920 B2 | 7/2014 | Krah | |
| 8,988,390 B1 | 3/2015 | Krah et al. | |
| 9,069,408 B2 | 6/2015 | Hotelling et al. | |
| 9,086,750 B2 | 7/2015 | Krah | |
| 2002/0067845 A1 * | 6/2002 | Griffis | 382/107 |
| 2003/0132922 A1 | 7/2003 | Philipp | |
| 2004/0056845 A1 * | 3/2004 | Harkcom et al. | 345/173 |
| 2004/0183833 A1 | 9/2004 | Chua | |
| 2006/0026521 A1 | 2/2006 | Hotelling et al. | |
| 2006/0097991 A1 | 5/2006 | Hotelling et al. | |
| 2006/0114650 A1 | 6/2006 | Wang et al. | |
| 2006/0132462 A1 | 6/2006 | Geaghan | |
| 2006/0197753 A1 | 9/2006 | Hotelling | |
| 2007/0109274 A1 | 5/2007 | Reynolds | |
| 2007/0268272 A1 * | 11/2007 | Perski et al. | 345/173 |
| 2007/0273663 A1 | 11/2007 | Park et al. | |
| 2008/0157867 A1 | 7/2008 | Krah | |
| 2008/0157893 A1 * | 7/2008 | Krah | 331/177 R |
| 2008/0158172 A1 | 7/2008 | Hotelling et al. | |
| 2008/0158184 A1 | 7/2008 | Land et al. | |
| 2008/0165203 A1 | 7/2008 | Pantfoerder | |
| 2008/0309625 A1 | 12/2008 | Krah et al. | |
| 2008/0309628 A1 | 12/2008 | Krah et al. | |
| 2009/0009483 A1 | 1/2009 | Hotelling et al. | |
| 2009/0189867 A1 | 7/2009 | Krah et al. | |
| 2009/0314621 A1 | 12/2009 | Hotelling | |
| 2010/0059295 A1 | 3/2010 | Hotelling et al. | |
| 2010/0060589 A1 | 3/2010 | Wilson | |
| 2010/0060593 A1 | 3/2010 | Krah | |
| 2014/0022203 A1 | 1/2014 | Karpin et al. | |
| 2015/0234535 A1 | 8/2015 | Hotelling et al. | |

FOREIGN PATENT DOCUMENTS

| | | | | |
|---|---|---|---|---|
| WO | WO 98/07127 | * | 2/1998 | G08C 21/00 |
| WO | WO-2008/085719 A2 | | 7/2008 | |
| WO | WO-2010/030706 A1 | | 3/2010 | |
| WO | WO-2010/030709 A1 | | 3/2010 | |

OTHER PUBLICATIONS

Rubine, D.H. (Dec. 1991). "The Automatic Recognition of Gestures," CMU-CS-91-202, Submitted in Partial Fulfillment of the Requirements for the Degree of Doctor of Philosophy in Computer Science at Carnegie Mellon University, 285 pages.

Rubine, D.H. (May 1992). "Combining Gestures and Direct Manipulation," CHI '92, pp. 659-660.

Westerman, W. (Spring 1999). "Hand Tracking, Finger Identification, and Chordic Manipulation on a Multi-Touch Surface," A Dissertation Submitted to the Faculty of the University of Delaware in Partial Fulfillment of the Requirements for the Degree of Doctor of Philosophy in Electrical Engineering, 364 pages.

Fakatselis, J. (Aug. 1996). "Processing Gain for Direct Sequence Spread Spectrum Communication Systems and PRISM®," Application Note AN9633, *Intersil*, four pages.

Final Office Action mailed Aug. 17, 2012, for U.S. Appl. No. 13/250,984, filed Sep. 30, 2011, 14 pages.

Final Office Action mailed Aug. 28, 2012, for U.S. Appl. No. 12/283,423, filed Sep. 10, 2008, nine pages.

Final Office Action mailed Dec. 30, 2013, for U.S. Appl. No. 12/208,329, filed Sep. 10, 2008, 12 pages.

Final Office Action mailed Feb. 26, 2015, for U.S. Appl. No. 12/208,329, filed Sep. 10, 2008, 13 pages.

International Search Report mailed Dec. 21, 2009, for PCT Application No. PCT/US2009/056413, filed Sep. 9, 2009, three pages.

International Search Report mailed Dec. 22, 2009, for PCT Application No. PCT/US2009/056410, filed Sep. 9, 2009, three pages.

Non-Final Office Action mailed May 20, 2011, for U.S. Appl. No. 12/283,435, filed Sep. 10, 2008, six pages.

Non-Final Office Action mailed Nov. 7, 2011, for U.S. Appl. No. 13/250,984, filed Sep. 30, 2011, nine pages.

Non-Final Office Action mailed Nov. 17, 2011, for U.S. Appl. No. 12/283,423, filed Sep. 10, 2008, nine pages.

Non-Final Office Action mailed Nov. 25, 2011, for U.S. Appl. No. 12/208,329, filed Sep. 10, 2008, 31 pages.

Non-Final Office Action mailed Apr. 13, 2012, for U.S. Appl. No. 13/250,984, filed Sep. 30, 2011, 14 pages.

Non-Final Office Action mailed Sep. 28, 2012, for U.S. Appl. No. 12/208,329, filed Sep. 10, 2008, 33 pages.

Non-Final Office Action mailed Oct. 5, 2012, for U.S. Appl. No. 13/568,027, filed Aug. 6, 2012, six pages.

Non-Final Office Action mailed Dec. 7, 2012, for U.S. Appl. No. 13/250,984, filed Sep. 30, 2011, 10 pages.

Non-Final Office Action mailed Apr. 23, 2013, for U.S. Appl. No. 13/568,027, filed Aug. 6, 2012, 8 pages.

Non-Final Office Action mailed Aug. 29, 2013, for U.S. Appl. No. 12/208,329, filed Sep. 10, 2008, 13 pages.

Non-Final Office Action mailed May 13, 2014, for U.S. Appl. No. 14/056,841, filed Oct. 17, 2013, seven pages.

Non-Final Office Action mailed Jun. 6, 2014, for U.S. Appl. No. 12/208,329, filed Sep. 10, 2008, 12 pages.

Non-Final Office Action mailed Sep. 29, 2014, for U.S. Appl. No. 14/315,162, filed Jun. 25, 2014, seven pages.

Non-Final Office Action mailed Dec. 14, 2015, for U.S. Appl. No. 12/208,329, filed Sep. 10, 2008, 14 pages.

Notice of Allowance mailed Apr. 5, 2012, for U.S. Appl. No. 12/283,435, filed Sep. 10, 2008, seven pages.

Notice of Allowance mailed Mar. 21, 2013, for U.S. Appl. No. 12/208,329, filed Sep. 10, 2008, 14 pages.

Notice of Allowance mailed May 23, 2013, for U.S. Appl. No. 13/250,984, filed Sep. 30, 2011, 10 pages.

Notice of Allowance mailed Aug. 23, 2013, for U.S. Appl. No. 13/250,984, filed Sep. 30, 2011, 10 pages.

Notice of Allowance mailed Aug. 29, 2013, for U.S. Appl. No. 12/283,423, filed Sep. 10, 2008, eight pages.

Notice of Allowance mailed Nov. 25, 2013, for U.S. Appl. No. 13/568,027, filed Aug. 6, 2012, nine pages.

Notice of Allowance mailed Mar. 11, 2014, for U.S. Appl. No. 13/568,027, filed Aug. 6, 2012, eight pages.

Notice of Allowance mailed Dec. 3, 2014, for U.S. Appl. No. 13/935,333, filed Jul. 3, 2013, nine pages.

Notice of Allowance mailed Jan. 15, 2015, for U.S. Appl. No. 14/056,841, filed Oct. 17, 2013, ten pages.

Notice of Allowance (corrected) mailed Mar. 19, 2015, for U.S. Appl. No. 14/056,841, filed Oct. 17, 2013, 7 pages.

Notice of Allowance mailed May 18, 2015, for U.S. Appl. No. 14/315,162, filed Jun. 25, 2014, eight pages.

* cited by examiner

CHANNEL SCAN ARCHITECTURE FOR MULTIPLE STIMULUS MULTI-TOUCH SENSOR PANELS

FIELD OF THE INVENTION

This relates to touch sensor panels that utilize multiple concurrent stimulation signals to detect and localize touch events, and more particularly, to a cost and power effective channel scan architecture capable of implementing a sequence of scans without intervention from a panel processor.

BACKGROUND OF THE INVENTION

Many types of input devices are presently available for performing operations in a computing system, such as buttons or keys, mice, trackballs, touch sensor panels, joysticks, touch screens and the like. Touch screens, in particular, are becoming increasingly popular because of their ease and versatility of operation as well as their declining price. Touch screens can include a touch sensor panel, which can be a clear panel with a touch-sensitive surface, and a display device that can be positioned behind the panel so that the touch-sensitive surface can substantially cover the viewable area of the display device. Touch screens can allow a user to perform various functions by touching the touch sensor panel using a finger, stylus or other object at a location dictated by a user interface (UI) being displayed by the display device. In general, touch screens can recognize a touch event and the position of the touch event on the touch sensor panel, and the computing system can then interpret the touch event in accordance with the display appearing at the time of the touch event, and thereafter can perform one or more actions based on the touch event.

Touch sensor panels can be formed from a matrix of drive and sense lines, with sensors or pixels defined, in some embodiments, by where the drive and sense lines cross over or come close to each other while being separated by a dielectric material. Drive or transmitting logic can be coupled to the drive lines, and sense or receiving channels can be coupled to the sense lines. During a scanning process, the drive logic can drive each drive line with a stimulation signal, and the sense channels can generate sense data indicative of the amount of charge injected into the sense lines due to the stimulation signal. A panel processor can identify touch locations based on the sense data, because the amount of charge is related to the amount of touch.

However, the voltage required by the drive logic for providing the stimulation signal can be much higher than the voltage required by the sense channels for sensing the injected charge. This can force the drive logic and sense channels to be implemented in discrete chips, causing the sensor panel circuitry to be larger in size and more expensive.

Further, involvement by the panel processor in the scanning process can occupy a significant amount of time, increasing the processing burden of the panel processor beyond that which is necessary to identify an occurrence or absence of a touch event based on sense data generated from the scanning process. This significant amount of processing time can make a processor too busy to perform other functions and can slow down devices using a sensor panel. Additionally, processors typically consume a significant amount of power during operation, which can be particularly problematic when a sensor panel is used in conjunction with a hand held device, as many hand-held devices have a limited power supply.

SUMMARY OF THE INVENTION

A channel scan architecture for detecting touch events on a touch sensor panel is disclosed. The channel scan architecture can combine drive logic, sense channels and channel scan logic on a single monolithic chip. The channel scan logic can be configured to implement a sequence of scanning processes in a panel subsystem without intervention from a panel processor.

Providing sensor panel circuitry on a single chip achieves hardware cost savings over multiple chip circuitry. The use of multiple stimulation frequencies and phases to sense touch events enables higher-power drive logic to operate with a reduced voltage on the same chip as lower-power sense channels. Implementing touch scanning functionality in dedicated logic in the panel subsystem decreases the processing burden of the panel processor.

The channel scan architecture can provide scan sequence control to enable the panel processor to control the sequence in which individual scans are implemented in the panel subsystem. Type of scans that can be implemented in the panel subsystem can include, for example, a spectral analysis scan, touch scan, phantom touch scan, ambient light level scan, proximity scan and temperature scan.

The spectral analysis scan can be used to select a clean frequency for use in the scan of the touch sensors. The touch scan can be used to identify an occurrence or absence of a touch event at the sensor panel. The phantom touch scan can be used to generate calibration data to adjust a baseline noise level associated with the touch sensors. The ambient light level scan can be used to identify an ambient light level at the sensor panel. The proximity scan can be used to identify an occurrence or absence of a proximity event at the sensor panel, such as an object hovering over the sensor panel. The temperature scan can be used to adjust parameters, such as channel gains, delays and the touch data baseline for example, to compensate for temperature-related drift of such parameters.

DETAILED DESCRIPTION OF THE PREFERRED EMBODIMENT

In the following description of preferred embodiments, reference is made to the accompanying drawings where it is shown by way of illustration specific embodiments in which the invention can be practiced. It is to be understood that other embodiments can be used and structural changes can be made without departing from the scope of the embodiments of this invention.

This relates to providing a cost and power effective architecture for detecting touch events on a touch sensor panel. In particular, drive logic, sense channels and channel scan logic can be provided on a single monolithic chip. Providing sensor panel circuitry on a single chip achieves hardware cost savings over multiple chip circuitry. The use of multiple stimulation frequencies and phases to sense touch events enables higher-power drive logic to operate with a reduced voltage on the same chip as lower-power sense channels. Further, channel scan logic can be provided to implement a sequence of scanning processes without intervention from a panel processor. Implementing touch scanning functionality in dedicated logic decreases the processing burden of the panel processor.

Although some embodiments of this invention may be described herein in terms of mutual capacitance touch sensors, it should be understood that embodiments of this invention are not so limited, but are generally applicable to other types of touch sensors such as self capacitance touch sensors. Furthermore, although the touch sensors in the touch sensor panel may be described herein in terms of an orthogonal array of touch sensors having drive and sense lines arranged in rows and columns, it should be understood that embodiments of this invention are not limited to row and columns or orthogonal arrays, but can be generally applicable to touch sensors arranged in any number of dimensions and orientations, including diagonal, concentric circle, and three-dimensional and random orientations. In addition, the touch sensor panel described herein can be either a single-touch or a multi-touch sensor panel, the latter of which is described in Applicant's co-pending U.S. application Ser. No. 11/649,998 entitled "Proximity and Multi-Touch Sensor Detection and Demodulation," filed on Jan. 3, 2007, the contents of which are incorporated by reference herein in their entirety for all purposes. The touch sensor panel may have drive and sense lines formed on separate substrates, opposite sides of a single substrate, or on the same side of a single substrate, some embodiments of the latter being described in U.S. patent application Ser. No. 12/110,075, entitled "Brick Layout and Stackup for a Touch Screen," filed on Apr. 25, 2008, the contents of which are incorporated herein by reference in their entirety for all purposes.

Figure 1:
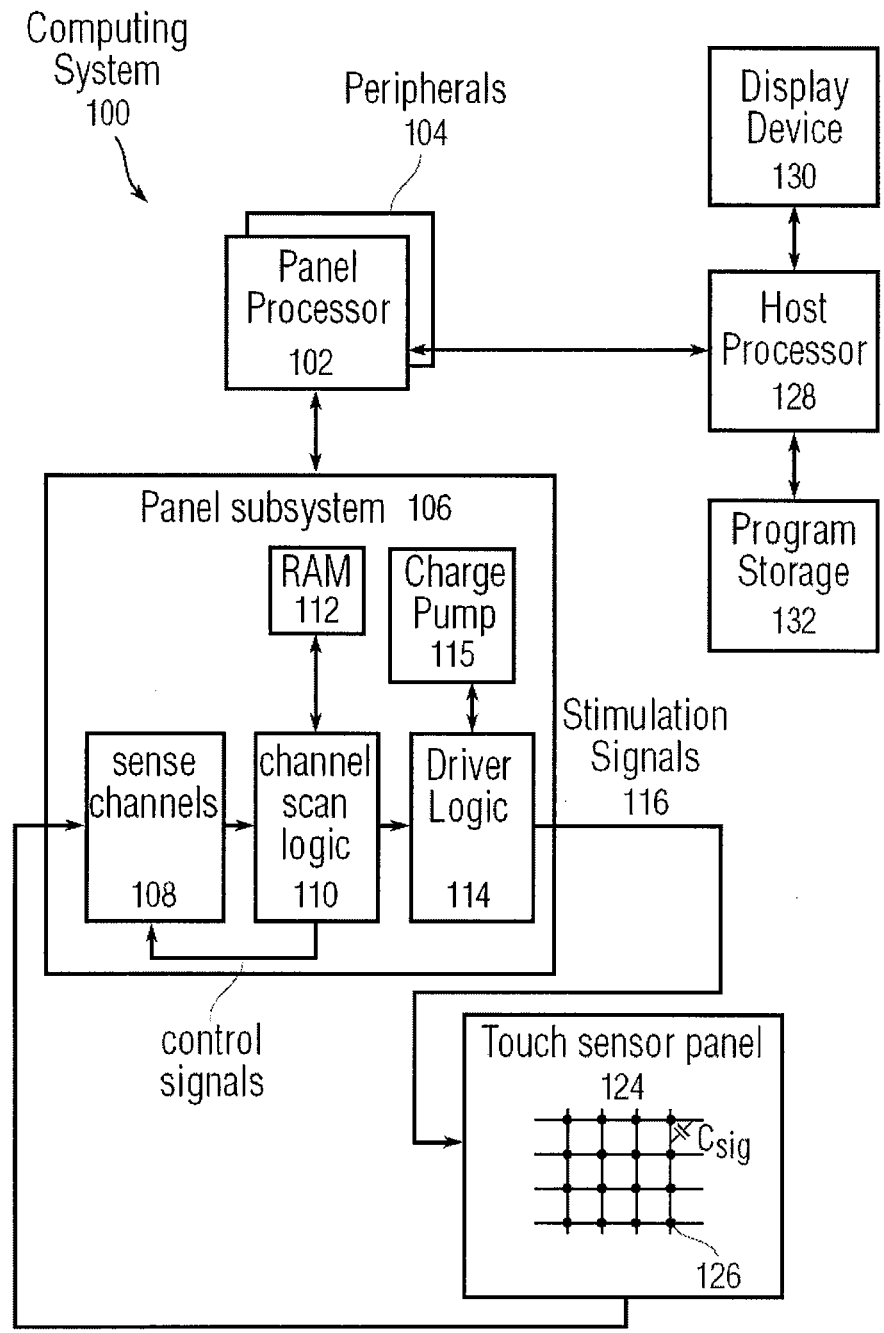
FIG. 1 illustrates an exemplary computing system that can use multiple stimulation frequencies and phases to sense touch events with a channel scan architecture according to embodiments of the invention.

FIG. 1 illustrates exemplary computing system 100 that can use multiple stimulation frequencies and phases to sense touch events with a channel scan architecture according to embodiments of the invention. Computing system 100 can include one or more panel processors 102 and peripherals 104, and panel subsystem 106. One or more panel processors 102 can include, for example, ARM968 processors or other processors with similar functionality and capabilities. However, in other embodiments, the panel processor functionality can be implemented instead by dedicated logic, such as a state machine. Peripherals 104 can include, but are not limited to, random access memory (RAM) or other types of memory or storage, watchdog timers and the like. Panel subsystem 106 can include, but is not limited to, one or more sense channels 108, channel scan logic 110 and driver logic 114. Channel scan logic 110 can access RAM 112, autonomously read data from the sense channels and provide control for the sense channels. In addition, channel scan logic 110 can control driver logic 114 to generate stimulation signals 116 at various frequencies and phases that can be selectively applied to multiple rows of touch sensor panel 124. In some embodiments, panel subsystem 106, panel processor 102 and peripherals 104 can be integrated into a single application specific integrated circuit (ASIC).

Touch sensor panel 124 can include a capacitive sensing medium having a plurality of row traces or driving lines and a plurality of column traces or sensing lines, although other sensing media can also be used. The drive and sense lines can be formed from a transparent conductive medium such as Indium Tin Oxide (ITO) or Antimony Tin Oxide (ATO), although other transparent and non-transparent materials such as copper can also be used. In some embodiments, the drive and sense lines can be perpendicular to each other, although in other embodiments other non-Cartesian orientations are possible. For example, in a polar coordinate system, the sensing lines can be concentric circles and the driving lines can be radially extending lines (or vice versa). It should be understood, therefore, that the terms "drive line" and "sense line," "row" and "column," "first dimension" and "second dimension," or "first axis" and "second axis" as used herein are intended to encompass not only orthogonal grids, but the intersecting traces or adjacent patterns of other geometric configurations having first and second dimensions (e.g. the concentric and radial lines of a polar-coordinate arrangement).

Where the drive and sense lines pass above and below (cross) each other (but do not make direct electrical contact with each other), or are adjacent to or nearby each other (in the case of drive and sense lines formed on the same side of a single substrate), the drive and sense lines can essentially form pairs of electrodes. Each pair of electrodes can represent a capacitive sensing node and can be viewed as picture element (pixel) 126, which can be particularly useful when touch sensor panel 124 is viewed as capturing an "image" of touch. (In other words, after processor 102 has determined whether a touch event has been detected at each touch sensor in the touch sensor panel, the pattern of touch sensors in the multi-touch panel at which a touch event occurred can be viewed as an "image" of touch (e.g., a pattern of fingers touching the panel). The capacitance between the pixel electrodes appears as a stray capacitance when the drive line for that pixel is held at direct current (DC) voltage levels and as a mutual signal capacitance Csig when the drive line is stimulated with an alternating current (AC) signal. The presence of a finger or other object near or on the touch sensor panel can be detected by measuring changes to a signal charge Qsig present at the pixels being touched, which is a function of Csig. Each sense line of touch sensor panel 124 can drive sense channel 108 (also referred to herein as an event detection and demodulation circuit) in panel subsystem 106.

Computing system 100 can also include host processor 128 for receiving outputs from panel processor 102 and performing actions based on the outputs that can include, but are not limited to, moving an object such as a cursor or pointer, scrolling or panning, adjusting control settings, opening a file or document, viewing a menu, making a selection, executing instructions, operating a peripheral device connected to the host device, answering a telephone call, placing a telephone call, terminating a telephone call, changing the volume or audio settings, storing information related to telephone communications such as addresses, frequently dialed numbers, received calls, missed calls, logging onto a computer or a computer network, permitting authorized individuals access to restricted areas of the computer or computer network, loading a user profile associated with a user's preferred arrangement of the computer desktop, permitting access to web content, launching a particular program, encrypting or decoding a message, and/or the like. Host processor 128 can also perform additional functions that may not be related to panel processing, and can be coupled to program storage 132 and display device 130 such as an LCD display for providing a UI to a user of the device.

In some systems, sensor panel 124 can be driven by high-voltage driver logic. The high voltages that can be required by the high-voltage driver logic (e.g. 18V) can force the high-voltage driver logic to be formed separate from panel subsystem 106, which can operate at much lower digital logic voltage levels (e.g. 1.7 to 3.3V). However, in embodiments of the invention, on-chip driver logic 114 can replace the off-chip high voltage driver logic. Although panel subsystem 106 can have low, digital logic level supply voltages, analog or digital panel driver circuitry may be implemented on chip. In one embodiment, panel driver circuitry 114 can generate stimulus voltage levels up to twice the maximum voltage allowable for the process of the multi-touch ASIC (e.g. 1.7 to 3.3V) by cascoding two transistors. The high voltage supply can be furnished by charge pump 115 that can also be integrated into the multi-touch ASIC. Although FIG. 1 shows charge pump 115 separate from driver logic 114, the charge pump can be part of the driver logic.

Figure 2A:
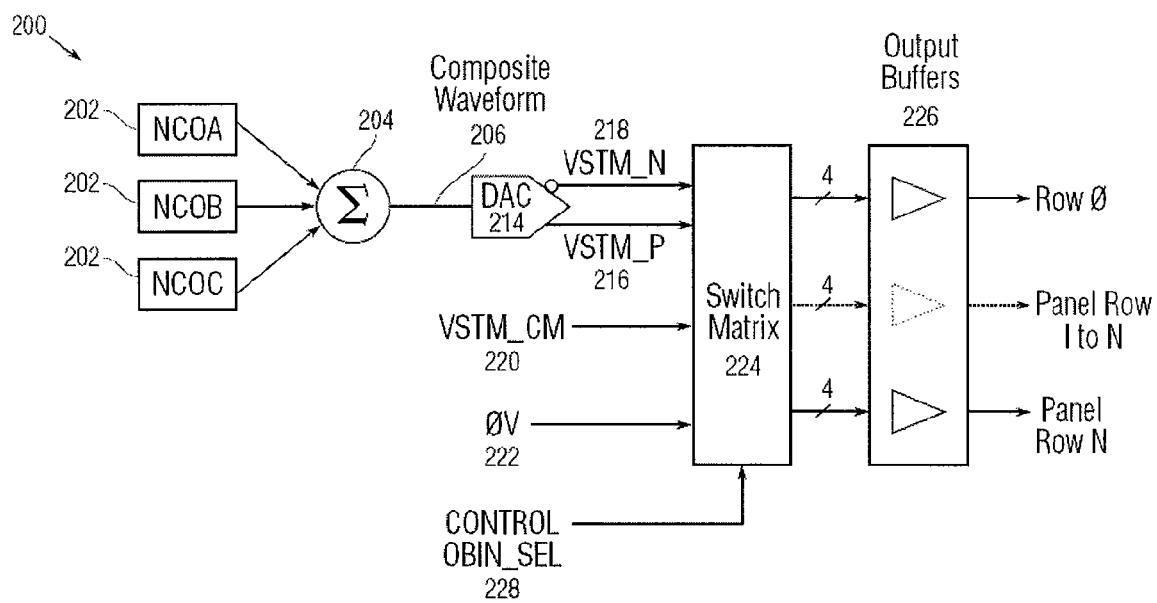
FIG. 2A illustrates an exemplary circuit for generating stimulation frequencies for stimulating the drive lines on the touch sensor panel according to one embodiment of this invention.

FIG. 2A illustrates one exemplary circuit 200 for generating stimulation frequencies for stimulating drive lines on a touch sensor panel according to embodiments of the invention. In FIG. 2A, more than one numerically controlled oscillator (NCO) 202 (e.g. NCOA, NCOB, NCOC), each generating a signed M-bit digital representation of a different frequency, can be summed in summing circuit 204, producing composite digital waveform 206, which can be converted into an analog waveform by DAC 214. DAC 214 can generate two phases of the analog waveform, a non-inverted (0 degrees or positive phase) version 216 (referred to as VSTM_P), and an inverted (180 degrees or negative phase) version 218 (referred to as VSTM_N) of the analog waveform. VSTM_N, VSTM_P, a common mode voltage VSTM_CM 220 and 0V (see 222) are fed into switch matrix 224. Following the switch matrix is an array of output buffers 226, one per panel drive line. Control signal OBIN_SEL[ ] 228 allows independent selection of either VSTM_P, VSTM_N, VSTM_CM or 0V for each of the output buffers.

Figure 2B:
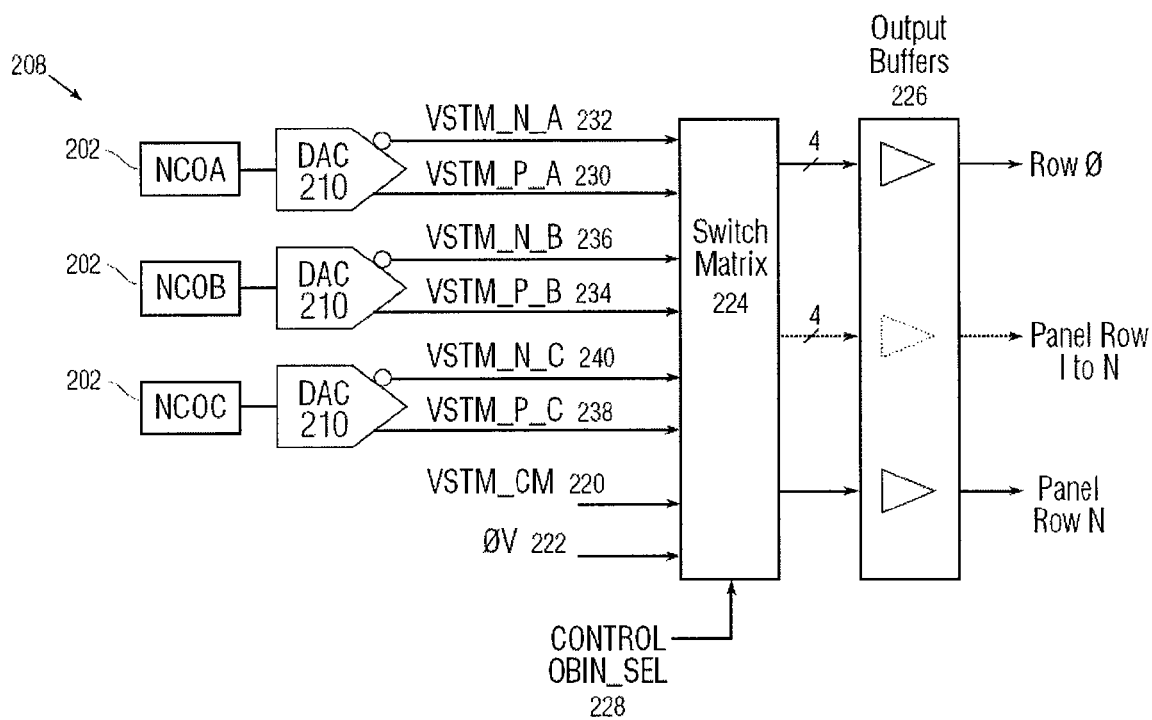
FIG. 2B illustrates another exemplary circuit for generating stimulation frequencies for stimulating the drive lines on the touch sensor panel according to one embodiment of this invention.

FIG. 2B illustrates another exemplary circuit 208 for generating stimulation frequencies for stimulating drive lines on a touch sensor panel according to embodiments of the invention. In FIG. 2B, more than one NCO 202 are each fed into one or more DACs 210, producing separate analog waveforms 212 VSTM_P_A 230, VSTM_N_A 232, VSTM_P_B 234, VSTM_N_B 236, VSTM_P_C 238, and VSTM_N_C 240, which are fed into switch matrix 224 along with common mode voltage VSTM_CM 220 and 0V 222. Following switch matrix 224 is an array of output buffers 226, one per panel drive line. Control signal OBIN_SEL[] 228 allows independent selection of either VSTM_P_A 230, VSTM_N_A 232, VSTM_P_B 234, VSTM_N_B 236, VSTM_P_C 238, VSTM_N_C 240, VSTM_CM 220 or 0V (see 222) for each of the output buffers.

Figure 2C:
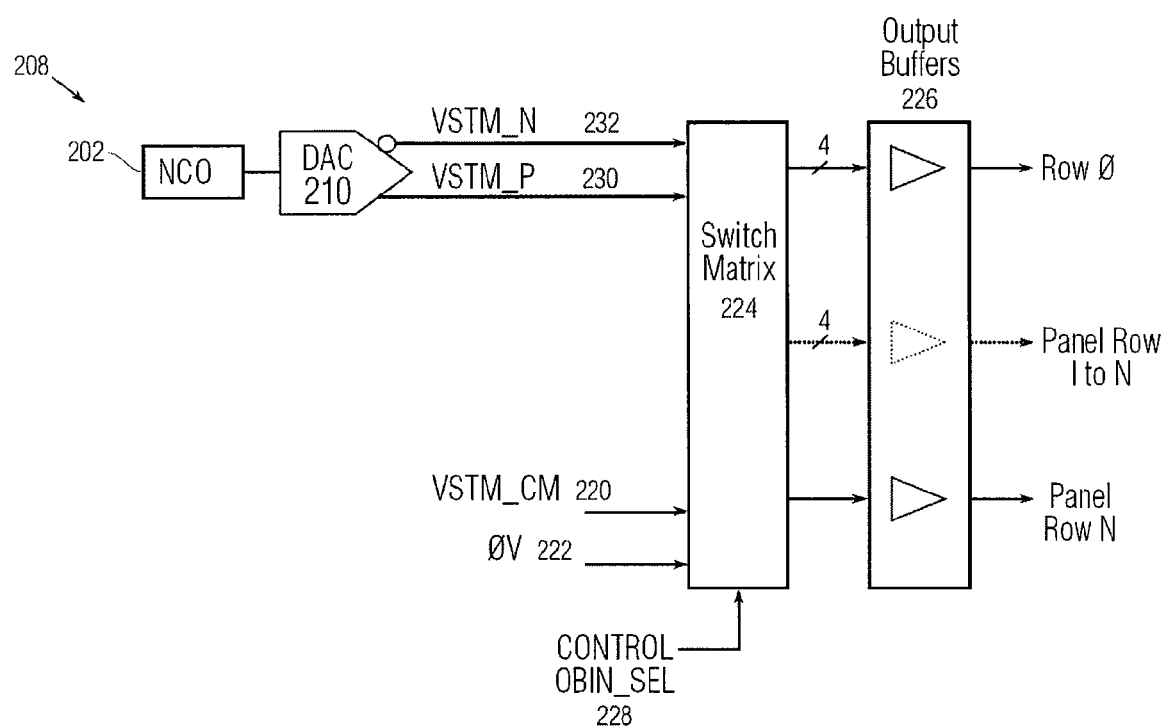
FIG. 2C illustrates another exemplary circuit for generating stimulation frequencies for stimulating the drive lines on the touch sensor panel according to one embodiment of this invention.

FIG. 2C illustrates exemplary circuit 208 according to an embodiment of the invention in which only one NCO 202 is fed into DAC 210, producing separate analog waveforms 212 VSTM_P 230 and VSTM_N 232, which are fed into switch matrix 224 along with common mode voltage VSTM_CM 220 and 0V 222. In the embodiment illustrated in FIG. 2C, control signal OBIN_SEL[ ] 228 allows independent selection of either VSTM_P 230, VSTM_N 232, VSTM_CM 220 or 0V (see 222) for each of the output buffers. Note that in either of FIGS. 2A, 2B or 2C, a composite waveform will be seen on the sense lines of the touch sensor panel.

Figure 3A:
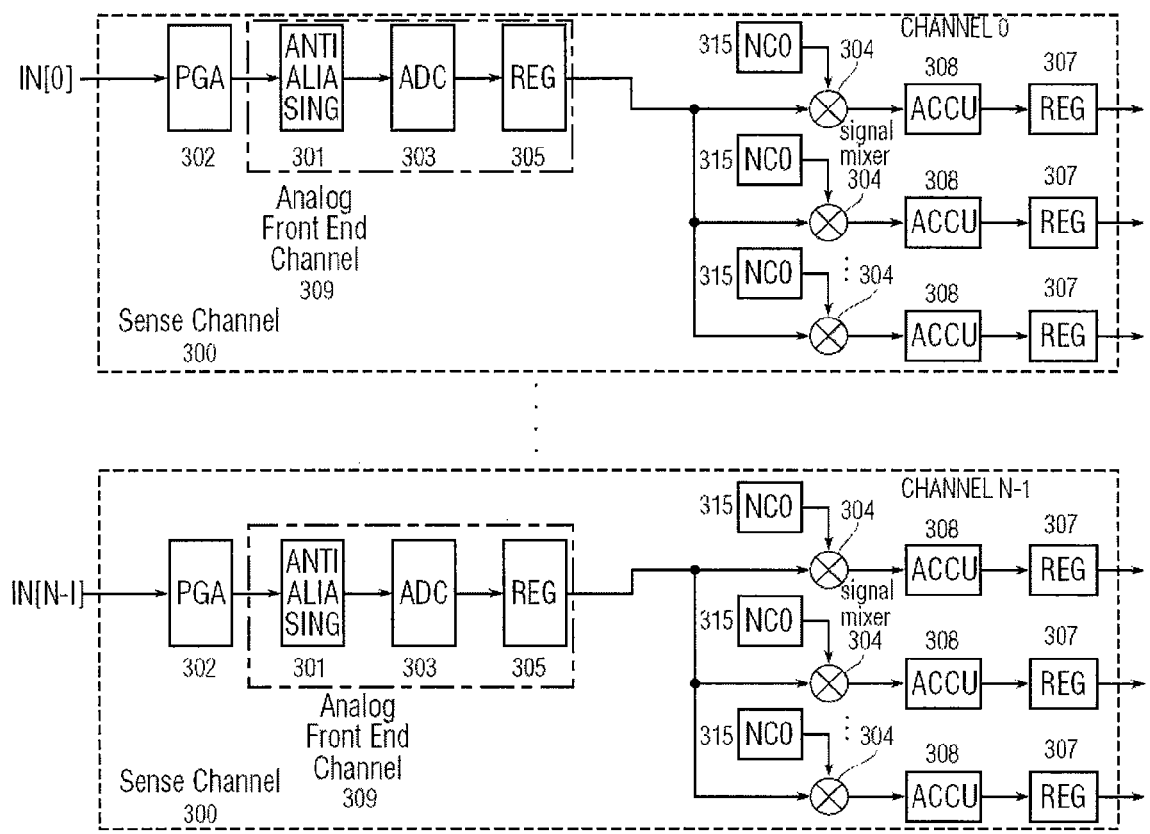
FIG. 3A illustrates a simplified block diagram of N exemplary sense channel or event detection and demodulation circuits according to one embodiment of this invention.
Figure 3B:
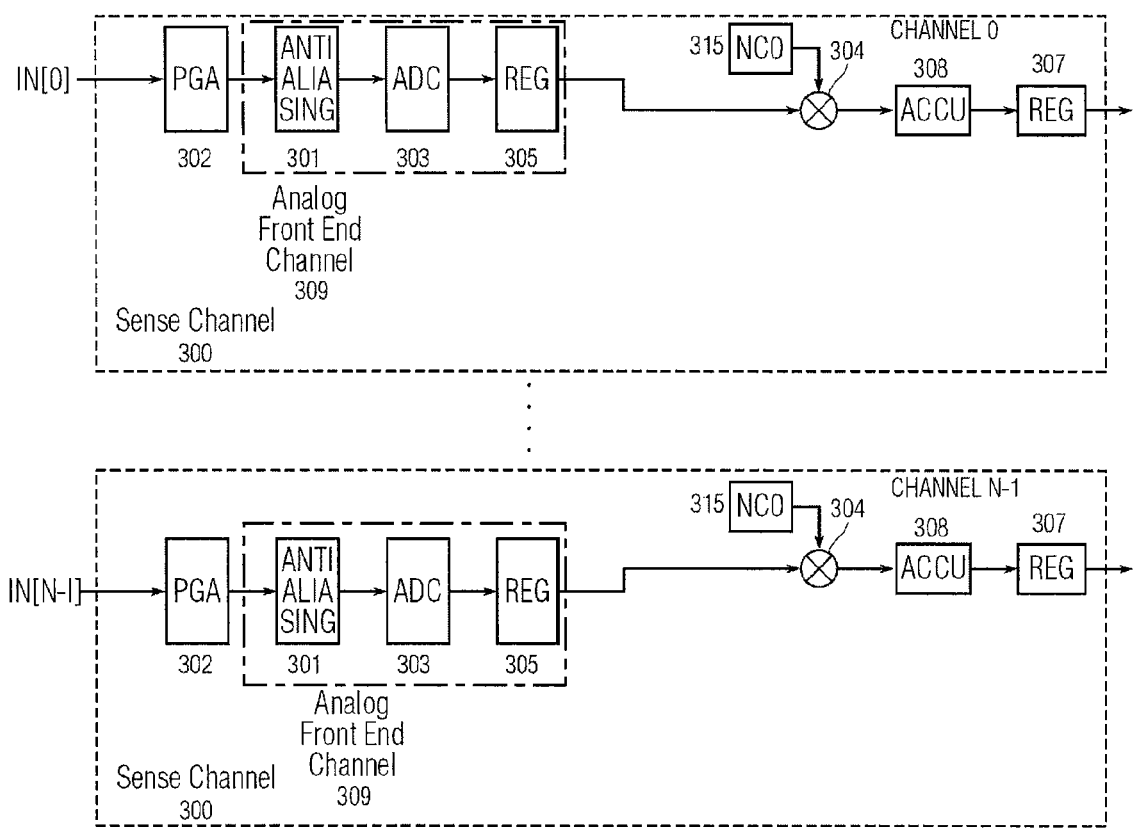
FIG. 3B illustrates another simplified block diagram of N exemplary sense channel or event detection and demodulation circuits according to one embodiment of this invention.

FIG. 3A illustrates a simplified block diagram of N exemplary sense channel or event detection and demodulation circuits 300 according to an embodiment of the invention. Each charge amplifier or programmable gain amplifier (PGA) 302 in sense channel 300 can be connected to analog front end channel 309, which in turn can be connected to R signal mixers 304. Beside PGA 302, analog front end channel 309 can include anti-aliasing filter 301, ADC 303, and result register 305. Each signal mixer 304 multiplies the digital signal from analog front end channels 309 with a demodulation signal generated by NCO 315 at the same stimulation frequencies generated by the circuits of FIGS. 2A and 2B. The demodulated output of each signal mixer 304 can be connected to a separate accumulator 308 and results register 307. FIG. 3B illustrates a simplified block diagram of N exemplary sense channel or event detection and demodulation circuits 300 according to an embodiment of the invention in which only a single demodulator is used per channel.

A more detailed description of an exemplary touch sensor panel and associated sense circuitry for using multiple stimulation frequencies and phases to detect touch events is described in U.S. application Ser. No. 11/818,345 filed on Jun. 13, 2007 and entitled "Multiple Simultaneous Frequency Detection," the contents of which are incorporated by reference herein in their entirety for all purposes.

A touch scan can be performed to capture multi-touch sense data without intervention from the panel processor, so that the sense data can be available for processing by the processor after a touch event has occurred. This can aid in the conservation of power as it does not require intervention from the panel processor during the scan. In the touch scan, composite multi-touch data can be captured over multiple timing sequences (e.g, 16 sequences, 200 us each) and posted into a buffer. Since this multi-touch data is composite data, a separate matrix decode logic can be utilized to extract the actual per-pixel Csig values and post them to memory, such as SRAM, where the processor can access the data for further processing after a touch event has occurred. Each touch scan can include several individual image scans, each performed at one or multiple different stimulus frequencies. The touch scan can precede or follow a scan in an auto-scan mode or can be performed in a separate scan.

A more detailed description of an auto-scan mode is described in U.S. application Ser. No. 12/022,572 filed on Jan. 30, 2008 and entitled "Auto Scanning for Multiple Frequency Stimulation Multi-Touch Sensor Panels," the contents of which are incorporated by reference herein in their entirety for all purposes.

Figure 4:
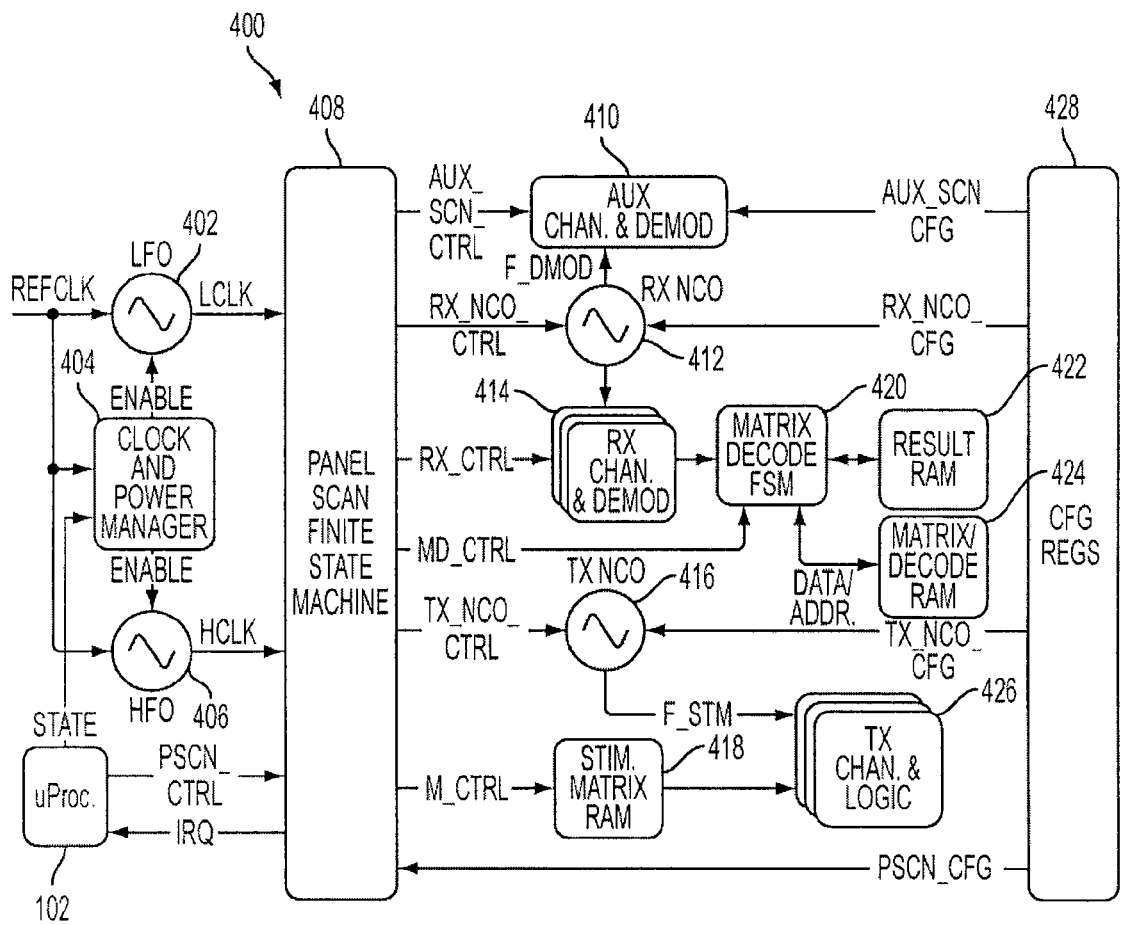
FIG. 4 illustrates an exemplary channel scan architecture according to one embodiment of this invention.

FIG. 4 illustrates exemplary channel scan architecture 400 according to one embodiment of this invention. In this architecture, processor 102 provides control to panel scan logic 408 to implement a sequence of scanning processes using components of subsystem 106, including sense channels 414, drive channels 426, and auxiliary channels and demodulators 410. Auxiliary channels and demodulators 410 pertain to sensing circuitry associated with sensors other than touch sensors, such as, for example, light, proximity and temperature sensors. Configuration registers 428 can store configuration data (counter values, phase increments, etc.) utilized by panel scan logic 408 in controlling each component of subsystem 106. Stimulation matrix 418 can determine the stimulation signals to be provided by drive channels 426, and matrix decode logic 420, result RAM 422 and matrix decode RAM 424 can be used to extract the per-pixel Csig values on the sense side. Panel scan logic 408 can be clocked by high frequency oscillator (HFO) 406 or low frequency oscillator (LFO) 402. HFO 406 and LFO 402 can be managed by clock and power manager 404, which can enable or disable the oscillators depending on whether a scan occurs in an active mode or auto-scan mode for example.

Figure 5:
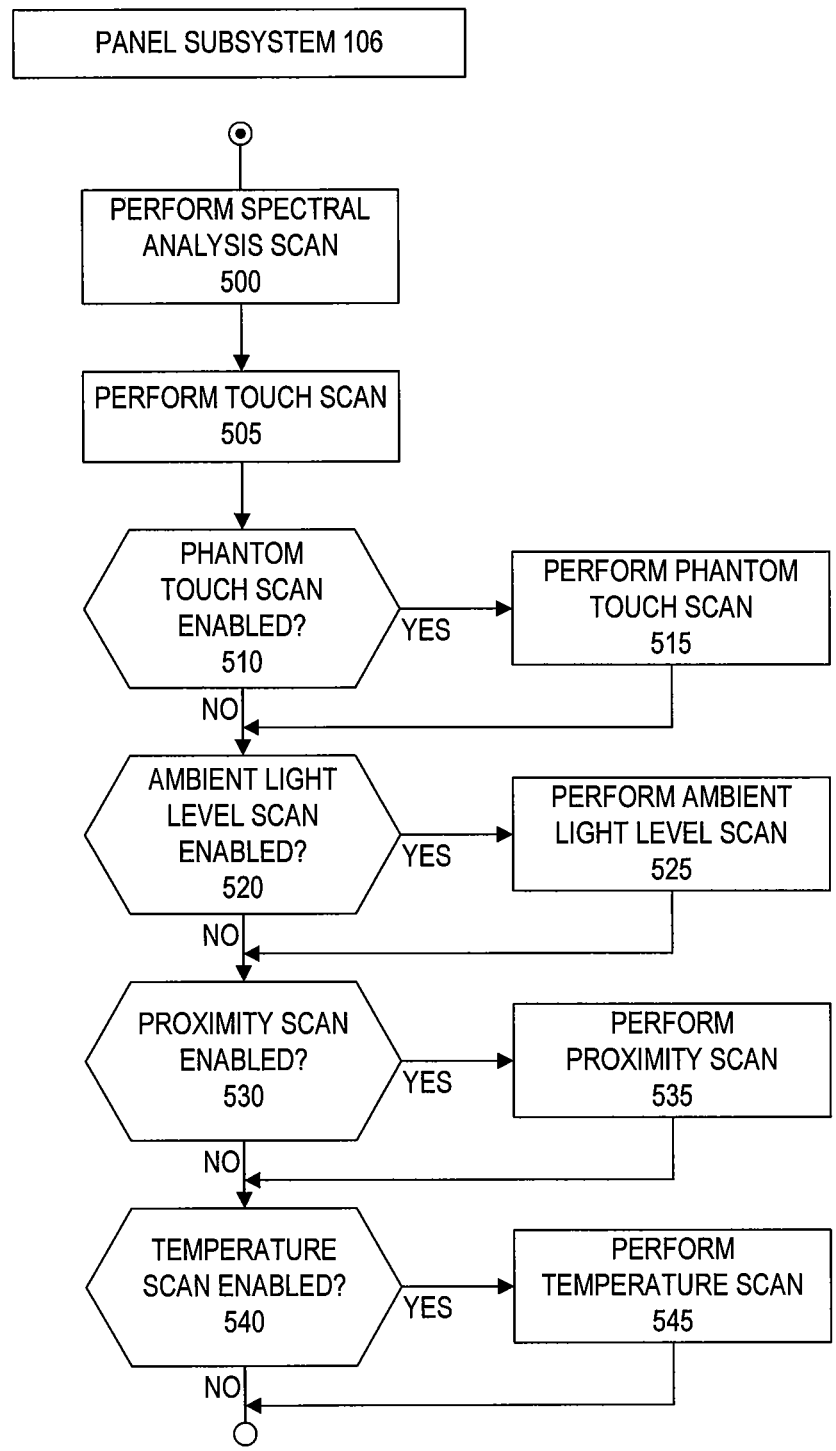
FIG. 5 illustrates an exemplary flow diagram that can be performed by logic associated with a panel subsystem according to one embodiment of this invention.

FIG. 5 illustrates an exemplary flow diagram that can be performed by dedicated logic associated with panel subsystem 106 according to one embodiment of this invention. Each of the described scans can be implemented by panel scan logic 408 of FIG. 4 in a particular sequence without intervention from panel processor 102. For example, during a particular scan sequence, subsystem 106 can perform a spectral analysis scan (step 500) followed by a touch scan (505). Depending on whether they are enabled (steps 510, 520, 530, 540), subsystem 106 can perform a phantom scan (step 515), ambient light level scan (step 525), proximity scan (535) and a temperature scan (step 545). FIGS. 6-11 describe particular operations that can be associated with each scan in an active mode, in which processor 102 is active to receive an interrupt from subsystem 106 after each scan is implemented.

Figure 6:
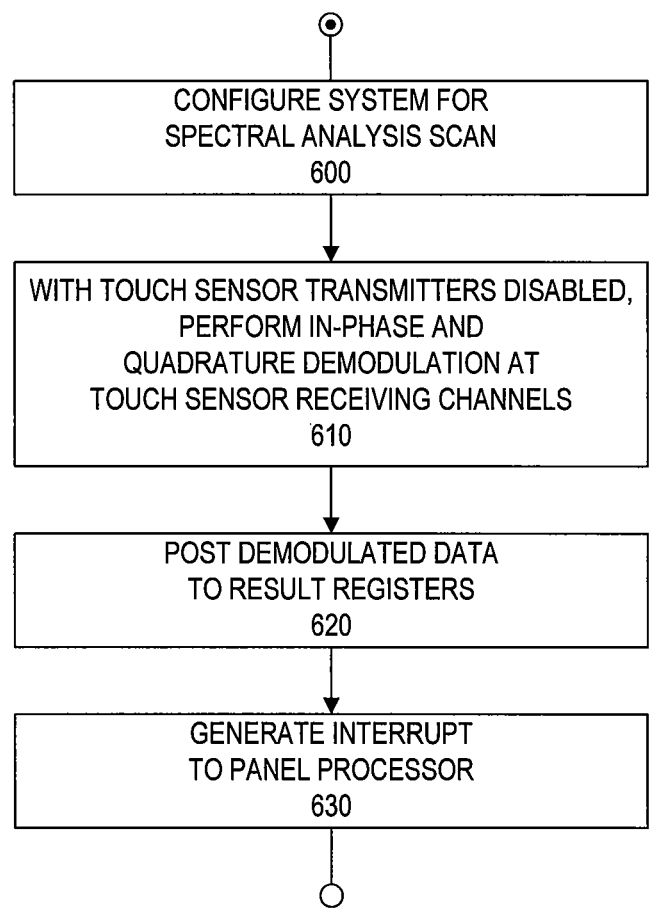
FIG. 6 illustrates an exemplary flow diagram that can be performed by logic associated with a spectral analysis scan according to one embodiment of this invention.

FIG. 6 illustrates an exemplary flow diagram that can be performed by logic associated with the spectral analysis scan according to one embodiment of this invention. The spectral analysis scan can be used to select a clean frequency for use in the scan of the touch sensors. In particular, subsystem 106 can configure the system for the spectral analysis scan (step 600), which can entail adjusting gains and delays of the appropriate circuitry. With the touch sensor drive channels disabled (e.g., driver logic 114 in FIG. 1 disabled so that no stimulation signals are sent to any of the drive lines in touch sensor panel 124), subsystem 106 can perform in-phase and quadrature demodulation, for different frequencies, of the sum of all analog output data at the touch sensor sense channels (step 610) for a number of sample clocks (e.g., mixers 304 and NCOs 315 in each sense channel 300 in FIG. 3 can perform in-phase and quadrature demodulation at different frequencies). When complete, the demodulated data can be posted to result registers (620) (e.g., result RAM 422 in FIG. 4), and an interrupt can be generated to the panel processor (630) notifying the processor that the spectral analysis scan is complete. At this stage, the processor can process the result data to select a clean frequency for use in the subsequent touch scan operation. A more detailed description of a spectral analysis scan is described in U.S. application Ser. No. 11/818,454 entitled "Detection of Low Noise Frequencies for Multiple Frequency Sensor Panel Stimulation," filed on Jun. 13, 2007, the contents of which are incorporated by reference herein in their entirety for all purposes.

Figure 7:
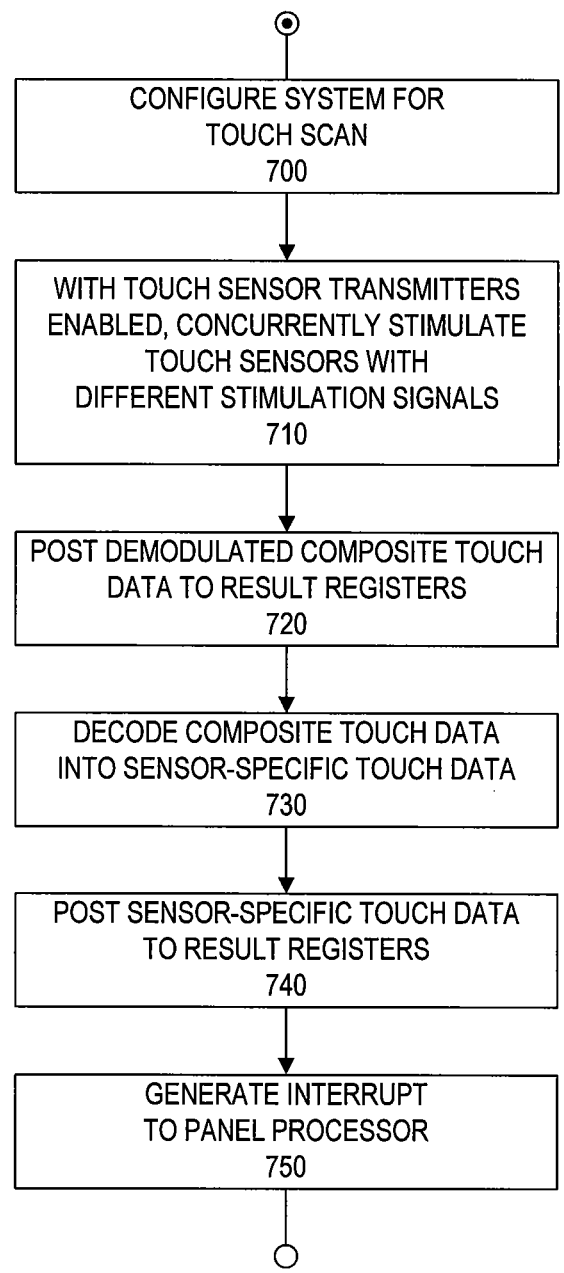
FIG. 7 illustrates an exemplary flow diagram that can be performed by logic associated with a touch scan according to one embodiment of this invention.

FIG. 7 illustrates an exemplary flow diagram that can be performed by logic associated with the touch scan according to one embodiment of this invention. The touch scan can be used to identify an occurrence or absence of a touch event at the sensor panel. In particular, subsystem 106 can configure the system for the touch scan (step 700), which can entail adjusting gains and delays of the appropriate circuitry. With the touch sensor drive channels enabled (e.g., driver logic enabled so that stimulation signals are sent to the drive lines in touch sensor panel as specified by the stimulation matrix RAM 418 of FIG. 4), subsystem 106 can concurrently stimulate the touch sensors with different stimulation signals (step 710) for a number of sample clocks. When complete, the demodulated data can be posted to result registers (720). Since the demodulated data represents composite sense data, subsystem 106 can decode the composite touch data into sensor-specific touch data (i.e., the per-pixel Csig values) using the matrix decode finite state machine 420 in FIG. 4, and post the decoded data into the result registers (step 740). Steps 710-740 can be repeated for multiple timing sequences using the stimulation signals identified in the stimulation matrix. When complete, an interrupt can be generated to the panel processor (750) notifying the processor that the touch scan is complete.

Figure 8:
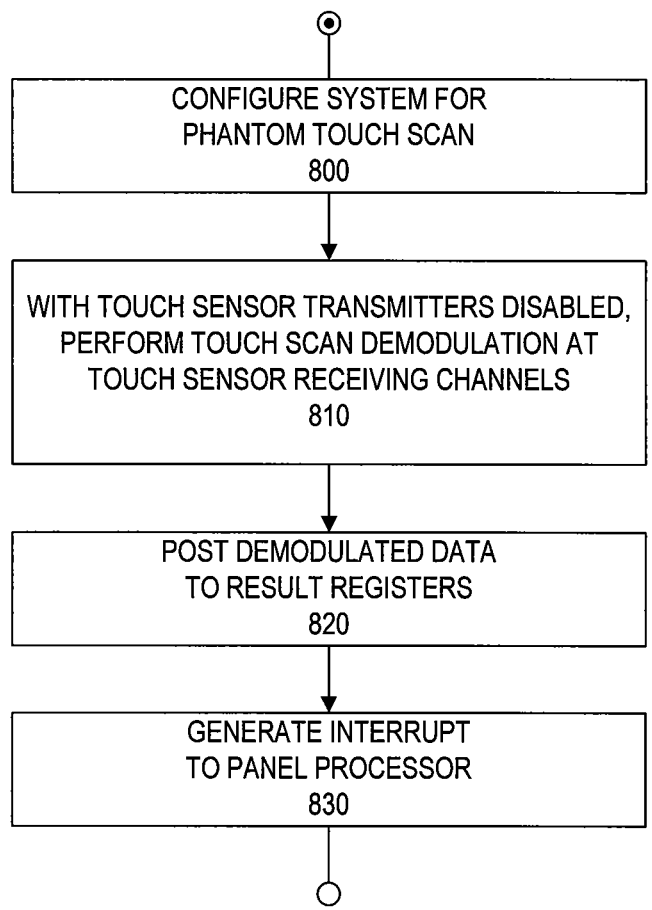
FIG. 8 illustrates an exemplary flow diagram that can be performed by logic associated with a phantom touch scan according to one embodiment of this invention.

FIG. 8 illustrates an exemplary flow diagram that can be performed by logic associated with the phantom touch scan according to one embodiment of this invention. The phantom touch scan can be used to generate calibration data to adjust a baseline noise level associated with the touch sensors. In particular, subsystem 106 can configure the system for the phantom touch scan (step 800), which can entail adjusting gains and delays of the appropriate circuitry. With the touch sensor drive channels disabled, subsystem 106 can perform a touch scan demodulation at the touch sensor sense channels (step 810) for a number of sample clocks at a particular frequency (e.g., a mixer 304 and NCO 315 in each sense channel 300 in FIG. 3 can demodulate the no-stimulation sense outputs of the touch sensor panel). When complete, the demodulated data can be posted to result registers (820), and an interrupt can be generated to the panel processor (830) notifying the processor that the phantom touch scan is complete. A more detailed description of phantom scanning and calibration is described in U.S. application Ser. No. 11/650,204 entitled "Error Compensation for Multi-Touch Surfaces," filed on Jan. 3, 2007, the contents of which are incorporated herein by reference in their entirety for all purposes.

Figure 9:
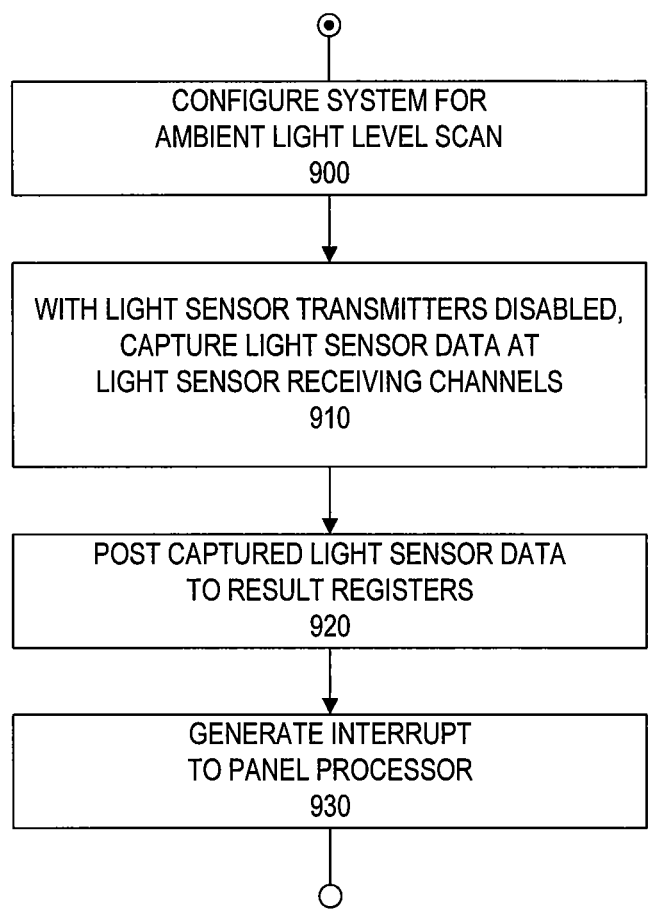
FIG. 9 illustrates an exemplary flow diagram that can be performed by logic associated with an ambient light level scan according to one embodiment of this invention.

FIG. 9 illustrates an exemplary flow diagram that can be performed by logic associated with an ambient light level scan according to one embodiment of this invention. The ambient light level scan can utilize one or more ambient light sensors incorporated into the sensor panel, and can be used to identify an ambient light level at the sensor panel. In particular, subsystem 106 (or alternatively, host processor 128 in FIG. 1), can configure the system for the ambient light level scan (step 900), which can entail adjusting gains and delays of the appropriate circuitry. Subsystem 106 (or the host processor) can capture light sensor data at light sensor sense channels (step 910) for a number of sample clocks (e.g., an auxiliary sense channel 410 in FIG. 4 can detect the ambient light level from a signal received from an ambient light sensor). When complete, the captured data can be posted to result registers (920), and an interrupt can be generated to the panel processor (930) notifying the processor that the ambient light level scan is complete. Alternatively, the ambient light sensor can generate digital values that can be communicated over a digital interface to the host processor, where similar processing can be performed. A more detailed description of a sensor panel including an ambient light sensor is described in U.S. application Ser. No. 11/800,293 entitled "Luminescence Shock Avoidance in Display Devices," filed on May 4, 2007, the contents of which are incorporated by reference herein in their entirety for all purposes.

Figure 10:
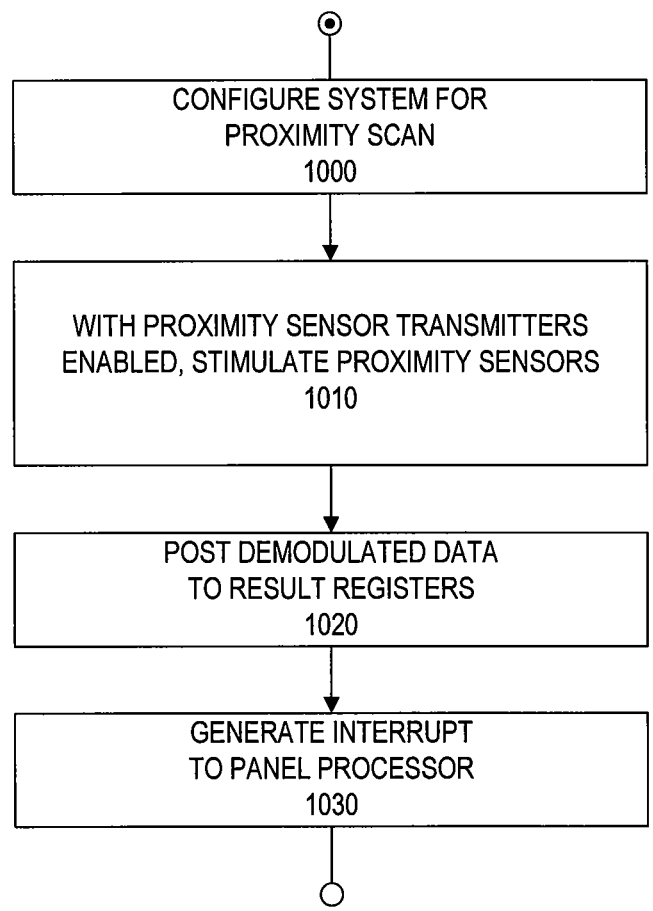
FIG. 10 illustrates an exemplary flow diagram that can be performed by logic associated with a proximity scan according to one embodiment of this invention.

FIG. 10 illustrates an exemplary flow diagram that can be performed by logic associated with a proximity scan according to one embodiment of this invention. The proximity scan can be used to identify an occurrence or absence of a proximity event at the sensor panel, such as an object hovering over the sensor panel. In particular, subsystem 106 can configure the system for the proximity scan (step 1000), which can entail adjusting gains and delays of the appropriate circuitry. With the proximity sensor drive channels enabled, subsystem 106 can stimulate the proximity sensors (step 1010) for a number of sample clocks. When complete, the demodulated data can be posted to result registers (1020), and an interrupt can be generated to the panel processor (1030) notifying the processor that the proximity scan is complete. A more detailed description of proximity sensors is described in U.S. application Ser. No. 11/818,345 entitled "Proximity and Multi-Touch Sensor Detection and Demodulation," previously incorporated by reference above.

Figure 11:
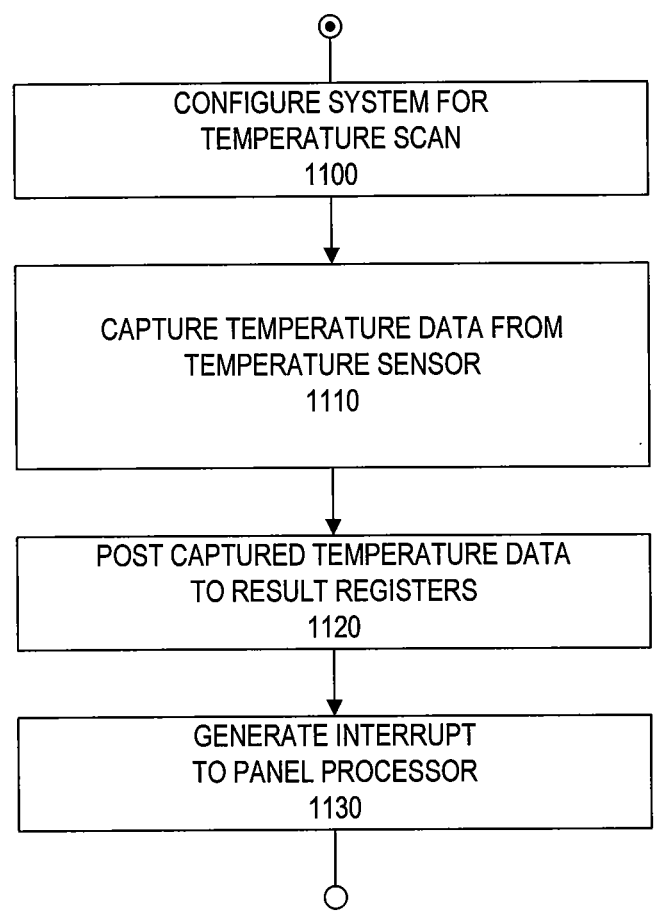
FIG. 11 illustrates an exemplary flow diagram that can be performed by logic associated with a temperature scan according to one embodiment of this invention.

FIG. 11 illustrates an exemplary flow diagram that can be performed by logic associated with a temperature scan according to one embodiment of this invention. The temperature scan can utilize a temperature sensor incorporated into computing system 100, such as in panel subsystem 106 for example. The temperature scan can be used to adjust parameters, such as channel gains, delays and the touch data baseline for example, to compensate for temperature-related drift of such parameters. In particular, subsystem 106 can configure the system for the temperature scan (step 1100), which can entail adjusting gains and delays of the appropriate circuitry. Subsystem 106 can capture temperature data from the temperature sensor (step 1110) for a number of sample clocks. When complete, the captured data can be posted to result registers (1120), and an interrupt can be generated to the panel processor (1130) notifying the processor that the temperature scan is complete.

In another embodiment, the scanning operations described in FIGS. 7-11 can be implemented in an auto-scan mode in which processor 102 is inactive. In this embodiment, since processor 102 is in an inactive state, panel subsystem 10 can wait until after all of the scans in a particular scan sequence have completed before awakening processor 102, rather than generating an interrupt to processor 102 after each scan as described above.

Panel scan logic 408 can include a scan sequence control (e.g., as shown by "PSCN_CTRL" and "PSCN_CFG" in FIG. 4). The scan sequence control can enable processor 102 to control the sequence in which the individual scans are performed by panel subsystem 106. For example, in certain applications, it may be beneficial to perform the temperature scan prior to the touch scan to calibrate out any temperature-related effects prior to touch scanning. Similarly, it may be beneficial to perform the proximity scan prior to the touch scan in certain applications, such as power sensitive applications for example. For instance, it may be beneficial to only perform the touch scan when an object is within a certain proximity of the touch panel. In one embodiment, the proximity scan can be used to detect if an object (such as a finger for example) is close by, and if the object is within a certain distance to the panel, then the touch scan is performed; otherwise the touch scan can be skipped.

According to an embodiment of the invention, the scan sequence control can be implemented as a scan sequence memory (e.g., in configuration registers 428), with each memory location (1 to N) indicating the order of scanning. For example, the memory can be 5 memory locations deep, with each memory location containing a 3 bit value that indicates the type of scan, as illustrated by the following:

0=Touch scan
1=Phantom touch scan
2=Ambient light level scan
3=Proximity scan
4=Temperature scan In this example, it can be presumed that the spectral analysis scan will always be implemented first in a scan sequence. According to the above example, the following exemplary scan sequence memory configuration:

| Memory Location | Data |
| --- | --- |
| 0 | 1 |
| 1 | 2 |
| 2 | 3 |
| 3 | 4 |
| 4 | 0 | can represent the following scan sequence after completion of the spectral analysis scan: phantom touch scan->ambient light level scan->proximity scan->temperature scan->touch scan. Processor 102 can set the scan sequence in configuration registers 428, allowing panel scan logic 408 to implement the scan sequence based on the set data without intervention from processor 102.

Figure 12A:
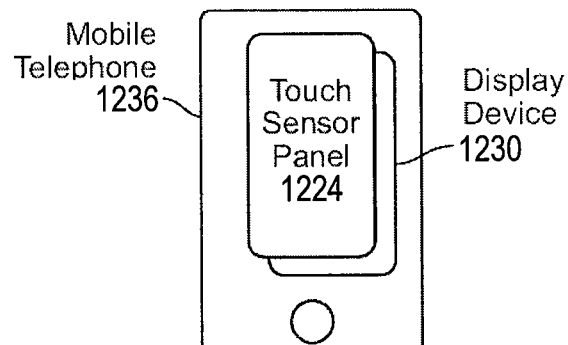
FIG. 12A illustrates an exemplary mobile telephone associated with a channel scan architecture according to one embodiment of this invention.

FIG. 12A illustrates exemplary mobile telephone 1236 that can include touch sensor panel 1224 and display device 1230, the touch sensor panel associated with a channel scan architecture according to embodiments of the invention.

Figure 12B:
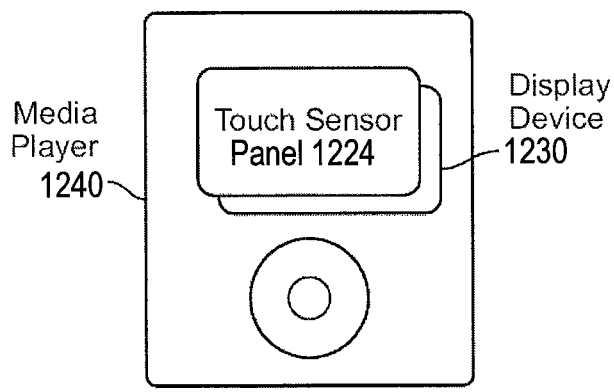
FIG. 12B illustrates an exemplary media player associated with a channel scan architecture according to one embodiment of this invention.

FIG. 12B illustrates exemplary digital media player 1240 that can include touch sensor panel 1224 and display device 1230, the touch sensor panel associated with a channel scan architecture according to embodiments of the invention.

Figure 12C:
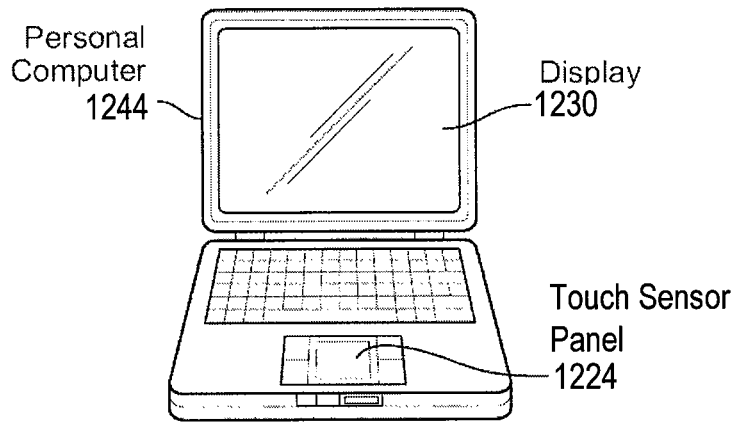
FIG. 12C illustrates an exemplary personal computer associated with a channel scan architecture according to one embodiment of this invention.

FIG. 12C illustrates exemplary personal computer 1244 that can include touch sensor panel 1224 and display 1230, the touch sensor panel and/or display of the personal computer (in embodiments where the display is part of a touch screen) associated with a channel scan architecture according to embodiments of the invention. The mobile telephone, media player and personal computer of FIGS. 12A, 12B and 12C can achieve improved touch panel operation by utilizing a channel scan architecture according to embodiments of the invention.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims.

What is claimed is:

1. A computing device comprising:
a sensor panel including a plurality of touch sensors; and
a single integrated circuit including:
- drive logic configured to stimulate the sensor panel,
- sense channels configured to sense touch applied to the sensor panel,
- panel subsystem logic configured to:
  - perform a scan of the touch sensors to generate touch sense data, wherein the scan of the touch sensors includes concurrently stimulating the touch sensors with a plurality of stimulation signals, wherein the plurality of stimulation signals includes at least a first stimulation signal with a first stimulation phase and a second stimulation signal with a second stimulation phase, the first stimulation phase different from the second stimulation phase, and
  - perform a no stimulation scan of the touch sensors to generate calibration data, and
- a processor configured to:
  - process the touch sense data to identify an occurrence or absence of a touch event at the sensor panel; and
  - process calibration data to adjust the baseline noise level associated with the touch sensors;
- wherein the panel subsystem logic is configured to perform the scan of the touch sensors and the no stimulation scan of the touch sensors without intervention from the processor.

2. The computing device of claim 1, wherein the scan of the touch sensors includes concurrently stimulating the touch sensors with multiple stimulation frequencies.

3. The computing device of claim 1, wherein
the processor is configured to process frequency selection data to select a clean frequency for use in the scan of the touch sensors, and
the panel subsystem logic is configured to perform a spectral analysis scan of the touch sensors to generate the frequency selection data without intervention from the processor.

4. The computing device of claim 3, wherein the spectral analysis scan includes performing quadrature demodulation of different frequencies at sense channels associated with the touch sensors.

5. The computing device of claim 1, wherein
the sensor panel includes a plurality of light sensors,
the processor is configured to process light sense data to identify an ambient light level at the sensor panel, and
the panel subsystem logic is configured to perform an ambient light level scan of the light sensors to generate the light sense data without intervention from the processor.

6. The computing device of claim 1, wherein
the sensor panel includes a plurality of proximity sensors,
the processor is configured to process proximity sense data to identify an occurrence or absence of a proximity event at the sensor panel, and
the panel subsystem logic is configured to perform a scan of the proximity sensors to generate the proximity sense data without intervention from the processor.

7. The computing device of claim 1, wherein
the computing device includes a temperature sensor,
the processor is configured to process temperature data to calibrate parameters associated with the touch sensors that are susceptible to temperature-related drift, and
the panel subsystem logic is configured to perform a scan of the temperature sensor to generate the temperature data without intervention from the processor.

8. The computing device of claim 1, wherein the panel subsystem logic performs each of a plurality of different types of scans, without intervention from the processor, in a sequence controlled by the processor.

9. An application-specific integrated circuit comprising:
a plurality of first drive channels configured to stimulate a touch sensor panel;
a plurality of first sense channels configured to sense a touch event at the touch sensor panel; and
panel subsystem logic configured to control the plurality of first drive channels and the plurality of first sense channels during a scan of the touch sensor panel and during a no stimulation scan of the touch sensor panel, wherein the scan of the touch sensor panel includes concurrently stimulating the touch sensors with a plurality of stimulation signals, wherein the plurality of stimulation signals includes at least a first stimulation signal with a first stimulation phase and a second stimulation signal with a second stimulation phase, the first stimulation phase different from the second stimulation phase and wherein the no stimulation scan of the touch sensor panel includes generating calibration data used to adjust the baseline noise level associated with the touch sensors;
wherein the panel subsystem logic is configured to perform the scan of the touch sensor panel and the no stimulation scan of the touch sensor panel without intervention from a processor.

10. The application-specific integrated circuit of claim 9, wherein the scan of the touch sensor panel includes concurrently stimulating the touch sensors with multiple stimulation frequencies.

11. The application-specific integrated circuit of claim 9, wherein the panel subsystem logic is configured to perform a spectral analysis scan of the touch sensor panel to generate frequency selection data.

12. The application-specific integrated circuit of claim 9, further comprising:
a plurality of second drive channels configured to stimulate a proximity sensor panel;
a plurality of second sense channels configured to sense a proximity event at the proximity sensor panel; and
panel subsystem logic configured to control the plurality of second drive channels and the plurality of second sense channels during a scan of the proximity sensor panel.

13. The application-specific integrated circuit of claim 9, the application-specific integrated circuit being incorporated within a computing device.

14. A computing device comprising:
a sensor panel including a plurality of touch sensors, wherein the plurality of touch sensors are stimulated with a plurality of stimulation signals during a scan of the plurality of touch sensors, the plurality of stimulation signals including at least a first stimulation signal with a first stimulation phase and a second stimulation signal with a second stimulation phase, the first stimulation phase different from the second stimulation phase, and wherein the plurality of touch sensors are not stimulated during a no stimulation scan of the plurality of touch sensors; and
a panel subsystem including a sense channel and decode logic, the sense channel coupled to the plurality of touch sensors, the sense channel superposing output signals indicative of a touch input event generated by the plurality of touch sensors and generating composite sense data based on the superposed output signals during a scan of the plurality of touch sensors, and the sense channel generating, during the no stimulation scan, calibration data used to adjust the baseline noise level associated with the touch sensors, and the decode logic configured to decode the composite sense data into sensor-specific sense data;

wherein the panel subsystem is configured to perform the scan of the touch sensors and the no stimulation scan of the touch sensors without intervention from a processor.

15. The computing device of claim 14, wherein the panel subsystem further comprises spectral scan logic, the spectral scan logic configured to perform a spectral analysis scan of the sensor panel.

16. A method for detecting and processing touch events on a touch sensor panel, comprising:

combining drive logic and sense channels on a single monolithic chip configured for being coupled to the touch sensor panel, wherein the drive logic is configured to stimulate the touch sensor panel concurrently with a plurality of stimulation signals during a touch scanning process of the touch sensor panel, the plurality of stimulation signals including at least a first stimulation signal with a first stimulation phase and a second stimulation signal with a second stimulation phase, the first stimulation phase different from the second stimulation phase, and wherein the drive logic is configured to not stimulate the touch sensor panel during a no stimulation scan of the touch sensor panel to generate calibration data used to adjust the baseline noise level associated with the touch sensor panel; and controlling the drive logic and sense channels during a touch scanning process and the no stimulation scan from within the chip without intervention from an on-chip processor.

17. The method of claim 16, further comprising performing a spectral analysis scan of the touch sensor panel from within the chip without intervention from the on-chip processor.

18. The method of claim 16, further comprising performing a phantom touch scan of the touch sensor panel from within the chip without intervention from the on-chip processor.

19. A mobile telephone comprising:
a sensor panel including a plurality of touch sensors; and
a single integrated circuit including
  drive logic configured to stimulate the sensor panel,
  sense channels configured to sense touch applied to the sensor panel,
  panel subsystem logic configured to:
    perform a scan of the touch sensors to generate touch sense data, wherein the scan of the touch sensors includes concurrently stimulating the touch sensors with a plurality of stimulation signals, wherein the plurality of stimulation signals includes at least a first stimulation signal with a first stimulation phase and a second stimulation signal with a second stimulation phase, the first stimulation phase different from the second stimulation phase, and
    perform a no stimulation scan of the touch sensors to generate calibration data, and
  a processor configured to:
    process the touch sense data to identify an occurrence or absence of a touch event at the sensor panel; and
    process calibration data to adjust the baseline noise level associated with the sensor panel;
wherein the panel subsystem logic is configured to perform the scan of the touch sensors and the no stimulation scan of the touch sensors without intervention from the processor.

20. A portable media player comprising:
a sensor panel including a plurality of touch sensors; and
a single integrated circuit including
  drive logic configured to stimulate the sensor panel,
  sense channels configured to sense touch applied to the sensor panel,
  panel subsystem logic configured to:
    perform a scan of the touch sensors to generate touch sense data, wherein the scan of the touch sensors includes concurrently stimulating the touch sensors with a plurality of stimulation signals, wherein the plurality of stimulation signals includes at least a first stimulation signal with a first stimulation phase and a second stimulation signal with a second stimulation phase, the first stimulation phase different from the second stimulation phase, and
    perform a no stimulation scan of the touch sensors to generate calibration data, and
  a processor configured to:
    process the touch sense data to identify an occurrence or absence of a touch event at the sensor panel; and
    process calibration data to adjust the baseline noise level associated with the sensor panel;
wherein the panel subsystem logic is configured to perform the scan of the touch sensors and the no stimulation scan of the touch sensors without intervention from the processor.

21. A personal computer comprising:
a sensor panel including a plurality of touch sensors; and
a single integrated circuit including
  drive logic configured to stimulate the sensor panel,
  sense channels configured to sense touch applied to the sensor panel,
  panel subsystem logic configured to:
    perform a scan of the touch sensors to generate touch sense data, wherein the scan of the touch sensors includes concurrently stimulating the touch sensors with a plurality of stimulation signals, wherein the plurality of stimulation signals includes at least a first stimulation signal with a first stimulation phase and a second stimulation signal with a second stimulation phase, the first stimulation phase different from the second stimulation phase, and
    perform a no stimulation scan of the touch sensors to generate calibration data, and
  a processor configured to:
    process the touch sense data to identify an occurrence or absence of a touch event at the sensor panel; and
    process calibration data to adjust the baseline noise level associated with the sensor panel;
wherein the panel subsystem logic is configured to perform the scan of the touch sensors and the no stimulation scan of the touch sensors without intervention from the processor.

* * * * *